(12) United States Patent
Song

(10) Patent No.: US 7,002,954 B1
(45) Date of Patent: Feb. 21, 2006

(54) METHOD FOR PROCESSING A LARGE AMOUNT OF INTRA-CALLS IN A REMOTE CONTROL SYSTEM OF A FULL ELECTRONIC TELEPHONE

(75) Inventor: Choon-Keun Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1045 days.

(21) Appl. No.: 09/625,943

(22) Filed: Jul. 26, 2000

(30) Foreign Application Priority Data

Jul. 26, 1999   (KR) ................................ 1999-30440

(51) Int. Cl.
*H04L 12/50* (2006.01)

(52) U.S. Cl. ...................................... 370/360; 370/363
(58) Field of Classification Search ................ 370/360, 370/362, 363
See application file for complete search history.

(56) References Cited

U.S. PATENT DOCUMENTS 4,621,358 A * 11/1986 Jotwani ....................... 370/359
5,164,940 A * 11/1992 Gray ........................... 370/363

* cited by examiner

*Primary Examiner*—Huy D. Vu
*Assistant Examiner*—Daniel Ryman
(74) *Attorney, Agent, or Firm*—Cha & Reiter, L.L.C.

(57) ABSTRACT

A method for processing a great amount of intra-calls in the remote control system of a full electronic exchange system, whose time switch block is provided with a voice memory device and a control memory device to switch the PCM data to the intra-direction, and with a call pass controller to transfer to the host system or loop to the intra-direction the PCM data, comprises the steps of writing call direction data for designating the intra-call direction into the data region of the control memory device to switch the PCM data sequentially stored in the voice memory device to the intra-direction, and looping the entire channels to the intra-direction to switch the PCM data from the time switch block to the intra-direction if the call direction data designates the intra-call direction according to the treatment of the great amount of the intra-calls.

2 Claims, 5 Drawing Sheets

[CONTROL MEMORY ADDRESS]

| | MODE | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| | CMS2 | CMS1 | CMS0 | OUTPUT CHANNEL | | | | | | OUTPUT SHW | | | | E/O | |
| 0 | | | | | | | | | | | | | | | 0 |
| | CMSEL | | | | | | 2K TIME SLOT | | | | | | | | |

| CMS2 | CMS1 | CMS0 | CMSEL | CONTROL MEMORY OPERATION |
|---|---|---|---|---|
| 0 | 0 | 0 | 0 | TCM0 |
| 0 | 0 | 1 | 1 | TCM1 |
| 0 | 1 | 0 | 2 | TCM2 |
| 0 | 1 | 1 | 3 | RCM0 |
| 1 | 0 | 0 | 4 | RCM1 |
| 1 | 0 | 1 | 5 | RCM2 |
| 1 | 1 | 0 | 6 | RCM3 |
| OUTPUT TS | | | | 2K-TIME SLOT OUTPUTTED TO SSL |
| OUTPUT SHW | | | | NUMBER OF 1K SUB-HIGHWAY OUTPUTTED TO INTRA-JUNCTOR |
| OUTPUT CH | | | | NUMBER OF 1K CHANNEL OUTPUTTED TO INTRA-JUNCTOR |
| E/O | | | | EVEN 1K/ODD 1K TIME SLOT, EVEN;0, ADD;1 |

FIG. 3B

[CONTROL MEMORY DATA]

| MODE | | | | | | | | | | | | | | | |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| LS | IB | CMS2 | CMS1 | CMS0 | INPUT CH | | | INPUT TS | | | | INPUT SHW | | | E/O |
| | | SMSEL | | | | | | | | | | | | | |

| SMS2 | SMS1 | SMS0 | SMSEL | SPEESCH MEMORY OPERATION |
|---|---|---|---|---|
| 0 | 0 | 0 | 0 | TCM(0~2) RCM(0~3) |
| 0 | 0 | 1 | 1 | TSM0(n) RSM0(n) |
| 0 | 1 | 0 | 2 | TSM1(n) RSM1(n) |
| 0 | 1 | 1 | 3 | TSM2(n) RSM2(n) |
| 1 | 1 | 0 | 6 | TSM3(n) |
| 1 | 0 | 0 | 4 | TSMIJ(n) |
| 1 | 0 | 1 | 5 | LSMIJ0(2) |
| | | | | LSMIJ1(2) |

| INPUT TS | 2K TIME SLOT INPUTTED FROM SSL |
|---|---|
| INPUT SHW | NUMBER OF 1K SUB-HIGHWAY INPUTTED FROM IJ OR FIJ |
| INPUT CH | NUMBER OF 1K CHANNEL INPUTTED FROM IJ OR FIJ |
| LS | INTER CALL LOOP 1:INTER, 0:LOOP |
| IB | INSERTING AND RETRIEVING CUT-OFF-CUT-BITS BY TSCMA | ps
METHOD FOR PROCESSING A LARGE AMOUNT OF INTRA-CALLS IN A REMOTE CONTROL SYSTEM OF A FULL ELECTRONIC TELEPHONE

CLAIM OF PRIORITY

This application makes reference to, incorporates the same herein, and claims all benefits accruing under 35 U.S.C. Section 119 from an application for METHOD FOR PROCESSING A GREAT AMOUNT OF INTRA-CALLS IN A REMOTE CONTROL SYSTEM OF A FULL ELECTRONIC TELEPHONE EXCHANGE SYSTEM filed earlier in the Korean Industrial Property Office on Jul. 26, 1999 and there duly assigned Ser. No. 30440/1999.

BACKGROUND OF THE INVENTION

1. Field of the Invention

The present invention relates to a remote control system of a full electronic telephone (PSDN/PSTN) exchange system. More particularly, the present invention relates to a method for processing a large number of intra-calls in the remote control system regardless of the limitation of the capacity of an intra-junctor.

2. Description of the Related Art

The conventional remote control system of a full electronic telephone switching system employs a non-blocking method for processing intra-calls (internal calls). Yet, the number of intra-calls that can be processed within the full electronic telephone exchanger is limited according to the intra-junctor capacity of the time switch block.

In the conventional TDX-10 and TDX-10A system utilizing a time division multiple access (TDMA) mode, the capacity of the intra-junctor is limited to less than a 1K time slot when processing the intra-calls in a non-blocking remote control system. Hence, the remote control system may not process a large number of intra-calls in non-blocking way due to both the traffic limitation and the capacity limitation of the intra-junctor. In addition, it is not possible to equip the intra-junctor with a large capacity due to the incompatibility with the host system, thus requiring a function for collecting lines to process a large amount of the intra-calls. Consequently, the limitation of the calls according to the capacity of the intra-junctor imposes problems in processing the intra-calls in a remote control system when dealing with a large capacity greater or equal to a 4K-time slot.

SUMMARY OF THE INVENTION

It is an object of the present invention to provide a method for processing a large amount of the intra-calls in the remote control system of a full electronic exchange system, which enables the remote control system to employ a larger capacity to be used in connection with the host link path.

It is another object of the present invention to provide a method for processing a large amount of the intra-calls in the remote control system of a full electronic exchange system, which enables the remote control system to employ both the time slot for the intra-junctor and the 4K time slot for the host link path.

According to an aspect of the present invention, a method for processing a great amount of intra-calls in the remote control system of a full electronic exchange system, whose time switch block is provided with a voice memory device and a control memory device to switch the PCM (Pulse Code Modulation) data to the intra-direction, and with a call pass controller to transfer the PCM data to the host system or to loop the PCM data to the intra-direction, the method comprising the steps of writing call direction data for designating the intra-call direction into the data region of the control memory device to switch the PCM data sequentially stored in the voice memory device to the intra-direction, and looping the entire channels to the intra-direction to switch the PCM data from the time switch block to the intra-direction if the call direction data designates the intra-call direction according to the treatment of the great amount of intra-calls.

The present invention will now be described more specifically with reference to the drawings attached only by way of example.

BRIEF DESCRIPTION OF THE ATTACHED DRAWINGS

FIGS. 3A and 3B are examples of the write format of a control memory device.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details. For the purpose of clarity, detailed descriptions of well-known devices, circuits, and methods are omitted so as not to obscure the description of the present invention with unnecessary detail.

Figure 1:
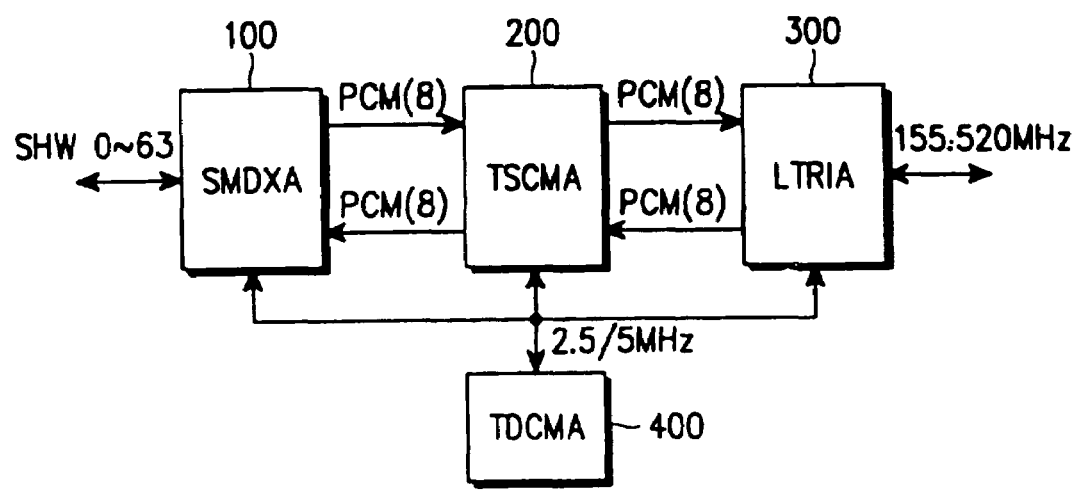
FIG. 1 is a block diagram for illustrating the structure of the time switch of the remote control system of a conventional full electronic exchange system.

With reference to FIG. 1, the time switch and link (TSL) circuit of the remote control system of a conventional full electronic exchange system comprises a sub-highway multiplexer & demultiplexer adapter (SMDXA) 100 for multiplexing the data received through the sub-highway SHW0~063 and the information in the form of PCM coded data is transferred to a time switch control and maintenance adapter (TSCMA) 200. Similarly, the SMDXA 100 demultiplexes the PCM data received from the TSCMA 200 and transfers the demultiplexed PCM data to the sub-highway SHW0~63.

The TSCMA 200 receives clock signals from a maximum of 4 local transfer and receiver interface adapters (LTRIAs) 300 and two pairs of signals in the level of low voltage differential signaling (LVDS) from a doubled remote network synchronization equipment (RNSE) when installed in a remote access switching module (RASM). Namely, one pair from the network synchronization A-side of the RASM and the other pair from the B-side are received from the supplemental connector of a time switch back panel adapter (TSBPA) through a 3*3 clock-cable. Since the fourfold link clock signal and twofold network synchronization clock signal may have different phases, a selected reference clock signal is transmitted to both SMDXA 100 and LTRIA 300 for the synchronization clock signal of the TSL block.

The LTRIA 300 receives the reference clock signal and reproduces the synchronization clock signal, transferring the FP2 and CP2 signals required for selecting the internal synchronization clock signal of the TSL in the LVDS level and the valid signal in the TTL level to the TSCMA 200. A telephony device control master (TDCMA) 400 is provided as a lower processor to control the devices.

Figure 2:
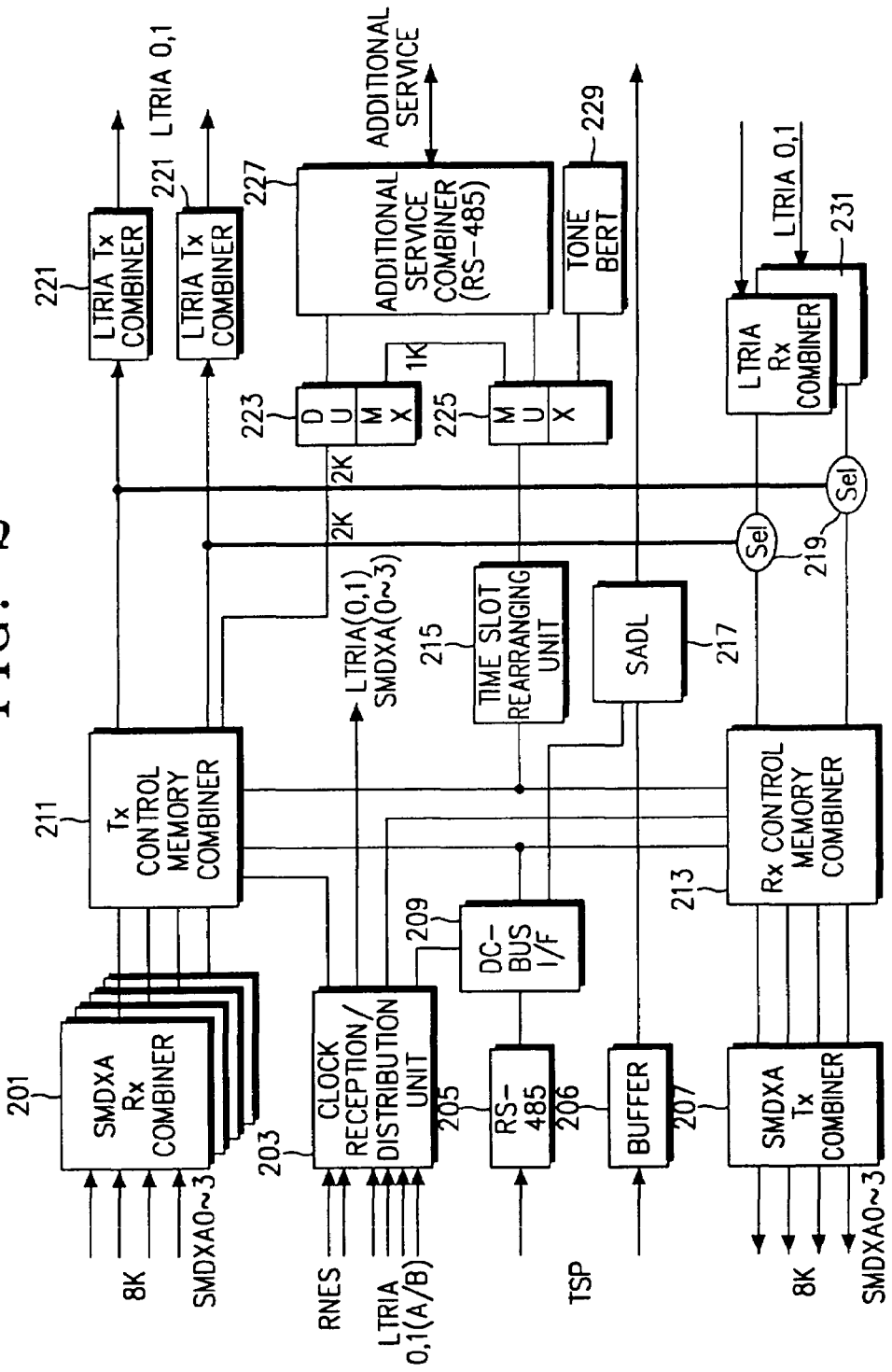
FIG. 2 is a block diagram for illustrating the structure of the time switch control and maintenance adapter (TSCMA) according to the present invention.

FIG. 2 illustrates the structure of the TSCMA according to the present invention. It includes a SMDXA Rx combiner 201 to combine the PCM data received from the SMDXA 100 of FIG. 1, treating a 2K time slot for each SMDXA and at maximum a 8K time slot when having four SMDXAs. The signal line receives the PCM data in the LVDS level.

A clock reception/distribution unit 203 receives the FP2 and CP2 signals inputted from the LTRIA 300 to the TSCMA 200 to distribute the synchronization pulses and clock signals selected in the same way for each doubled board among the boards. An RS-485 device 205 receives the signals from the TDCMA 400 and interfaces through a DS-BUS I/F 209, and the received signals are also stored in a buffer 206 for a subsequent transmission to a System Address/Data Bus (SADL) 217.

An SMDXA Tx combiner 207 switches the PCM data of the TSCMA 200 to the SMDXA 100, treating a 2K time slot for each SMDXA, and at maximum 8K time slot for four SMDXAs. The PCM data line transmits data in the LVDS level.

A Tx control memory combiner 211 comprises a voice memory device and control memory device serve to switch 16.384 Mbps voice data of 2K time slot inputted from the SMDXA 100 at maximum 8K time slot in the inter-direction (S-Switch or Host system) and intra-direction. Here, the switched PCM data may be transferred to the inter-direction (S-Switch), or looped to an Rx control memory combiner 213. In addition, the 2K time slot PCM data in the intra-direction is demultiplexed in the outside of the memory module with the even 1K for the intra-looping and the odd 1K to the additional services. A Dumx 223 is provided to receive the output of the Tx control memory combiner 211.

The Rx control memory combiner 213 switches the 2K time slot PCM data inputted from the LTRIA 300, and the 2K time slot PCM data formed through the inter-path. The LTRIA 300 may contain at maximum 4K-time slot, and transmit the switched PCM data at maximum 8K-time slot to the SMDXA 100 in the LVDS level. A time slot-rearranging unit 215 rearranges the time slot of the intra-switched PCM data. A Mux 225 is coupled to receive the output of the time slot-rearranging unit 215, and the output of the Mux 225 is transmitted to a tone bert 229 for conversion or to a bit error-rate test.

A call pass controller Sel 219 is a looping processor to the host system, making the inter-call service of the host system not require the call pass through the LTRIA 300. Hence, the entire channels are looped and used for the call pass under S/W control; a maximum of 4K-time slot may be used.

A LTRIA Tx combiner 221 transfers the PCM data switched in the TSCMA 200 to the LTRIA 300, treating 2K time slot for each LTRIA, and at maximum 4K time slot for two LTRIAs. The PCM data is transmitted in the LVDS level. An additional service combiner 227 serves to process recorded voice guides, conference calls, DTMF, and R2 signals, and also transmits the reference clock signals MCLK and MFS to the TSCMA 200. An LTRIA Rx combiner 231 serves to combine the PCM data received from the LTRIA 300, treating 2K-time slot for each LTRIA. The PCM data is received in the LVDS level.

Hereinafter is described the write format of the control memory device in reference to FIGS. 3A and 3B. In order to control the PCM data inputted from the TSL block, the control memory should be written by the lower processor. Thus, the control memory device is written with the format, as shown in FIGS. 3A and 3B, in order to switch the data sequentially written into the voice memory device to a desired direction. If the inter-directional data region Bit 15(LS) of the control memory device is set to "0" while processing a large amount of the intra-calls, the inter-call is written into the Rx-direction voice memory becoming the intra-call instead of the inter-call of the S-Switch direction, so that 4K inter-call may be used as the intra-call by employing the data region Bit 15 when switching the 2K and 4K regions of the intra-call.

The data regions of the control memory device are divided into the output data region as shown in FIG. 3A and the input data region as shown in FIG. 3B, written with data for selecting a memory and address for each input/output data, kind of the input/output memory, capacity of the input/output time slot, number of the sub-highway input/output through the intra-junctor, and data for selecting the channel number input/output through the intra-junctor. In addition, the output data region is written with data for E/O (Even/Odd) data, while the input data region is written with the data for designating the inter- and intra-call, and with the data for inserting and retrieving the cut-off-cut-bits by the TSCMA 200.

Figure 4:
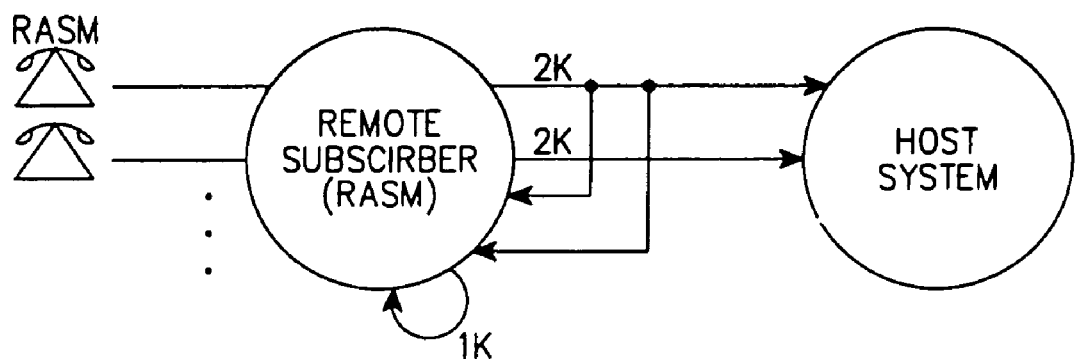
FIG. 4 is a schematic diagram for illustrating the process of treating a great amount of the intra-calls by the remote control system according to the present invention.

Referring to FIG. 4, a large amount of intra-calls are looped by writing data for designating the intra-calls into the data region of the control memory device, as shown in FIG. 3. As described above, this is achieved by providing the time switch block of the full electronic exchange system with a voice memory device and a control memory device to switch the PCM data to the intra-direction and with a call pass controller to transfer to the host system or loop to the intra-direction the PCM data. Then, the data region of the control memory is written with the call direction data for designating the intra-call direction to switch the PCM data sequentially stored in the voice memory device to the intra-direction, so that the entire channels may be looped to the intra-direction to switch the PCM data from the time switch block to the intra-direction.

Thus, the remote control system of the full electronic exchange system may process a large amount of intra-calls by employing the host link path for processing them under a software control without any additional board and hardware, regardless of the capacity of the intra-junctor. While the present invention has been described in connection with specific embodiments accompanied by the attached drawings, it will be readily apparent to those skilled in the art that various changes and modifications may be made thereto without departing the gist of the present invention.

What is claimed is:

1. A method for processing a large amount of intra-calls in a remote control system of a full electronic exchange system having a time switch block with a voice memory device and a control memory device having an input and output data regions to switch the Pulse Code Modulation (PCM) data to an intra-direction, and a call pass controller for transferring said PCM data to a host system and for looping said PCM data to said intra-direction, comprising the steps of:

writing call direction data for designating an intra-call direction into the respective said input and output data regions of said control memory device at a designated memory and address to switch said PCM data sequentially stored in said voice memory device to said intra-direction; and, looping entire channels to said intra-direction to switch said PCM data from said time switch block to said intra-direction if said call direction data designates said intra-call direction based on the amount of said intra-calls.

2. The method as defined in claim 1, wherein the step of writing call direction data further includes the step of writing data to select the kind of input/output memory, the capacity of an input/output time slot, the number of a sub-highway inputted/outputted through an intra-junctor, and the number of the channel inputted/outputted through said intra-junctor.

* * * * *